United States Patent [19]

Perkins

[11] 4,232,562
[45] Nov. 11, 1980

[54] LEAD SCREW LINEAR ACTUATOR

[75] Inventor: Gerald S. Perkins, Altadena, Calif.

[73] Assignee: California Institute of Technology, Pasadena, Calif.

[21] Appl. No.: 961,294

[22] Filed: Nov. 16, 1978

[51] Int. Cl.² .............................................. F16H 1/20
[52] U.S. Cl. ........................ 74/424.8 R; 128/DIG. 1
[58] Field of Search ................. 74/424.8 R; 417/350, 417/534; 128/214 F, 218 A, 236, DIG. 1

[56] References Cited

U.S. PATENT DOCUMENTS

| | | | |
|---|---|---|---|
| 966,128 | 6/1911 | Payne et al. | 128/218 A |
| 1,988,480 | 1/1935 | Campkin | 128/DIG. 1 |
| 2,067,819 | 1/1937 | Bell | 417/418 |
| 2,446,393 | 8/1948 | Russell | 318/675 |
| 2,508,253 | 5/1950 | Haggardt | 417/254 |
| 3,278,774 | 10/1964 | Roller et al. | 310/76 |
| 3,556,679 | 1/1971 | Middlebusher et al. | 417/63 |
| 3,979,999 | 9/1976 | Emenaker | 92/17 X |
| 4,145,165 | 3/1979 | Perkins et al. | 417/418 |
| 4,150,925 | 4/1979 | Perkins | 417/418 |

*Primary Examiner*—C. J. Husar
*Assistant Examiner*—Conrad Berman
*Attorney, Agent, or Firm*—Freilich, Hornbaker, Wasserman, Rosen & Fernandez

[57] ABSTRACT

A linear actuator which can apply high forces is described, which includes a reciprocating rod having a threaded portion engaged by a nut that is directly coupled to the rotor of an electric motor. The nut is connected to the rotor in a manner that minimizes loading on the rotor, by the use of a coupling that transmits torque to the nut but permits it to shift axially and radially with respect to the rotor. The nut has a threaded hydrostatic bearing for engaging the threaded rod portion, with an oilcarrying groove in the nut being interrupted.

10 Claims, 7 Drawing Figures

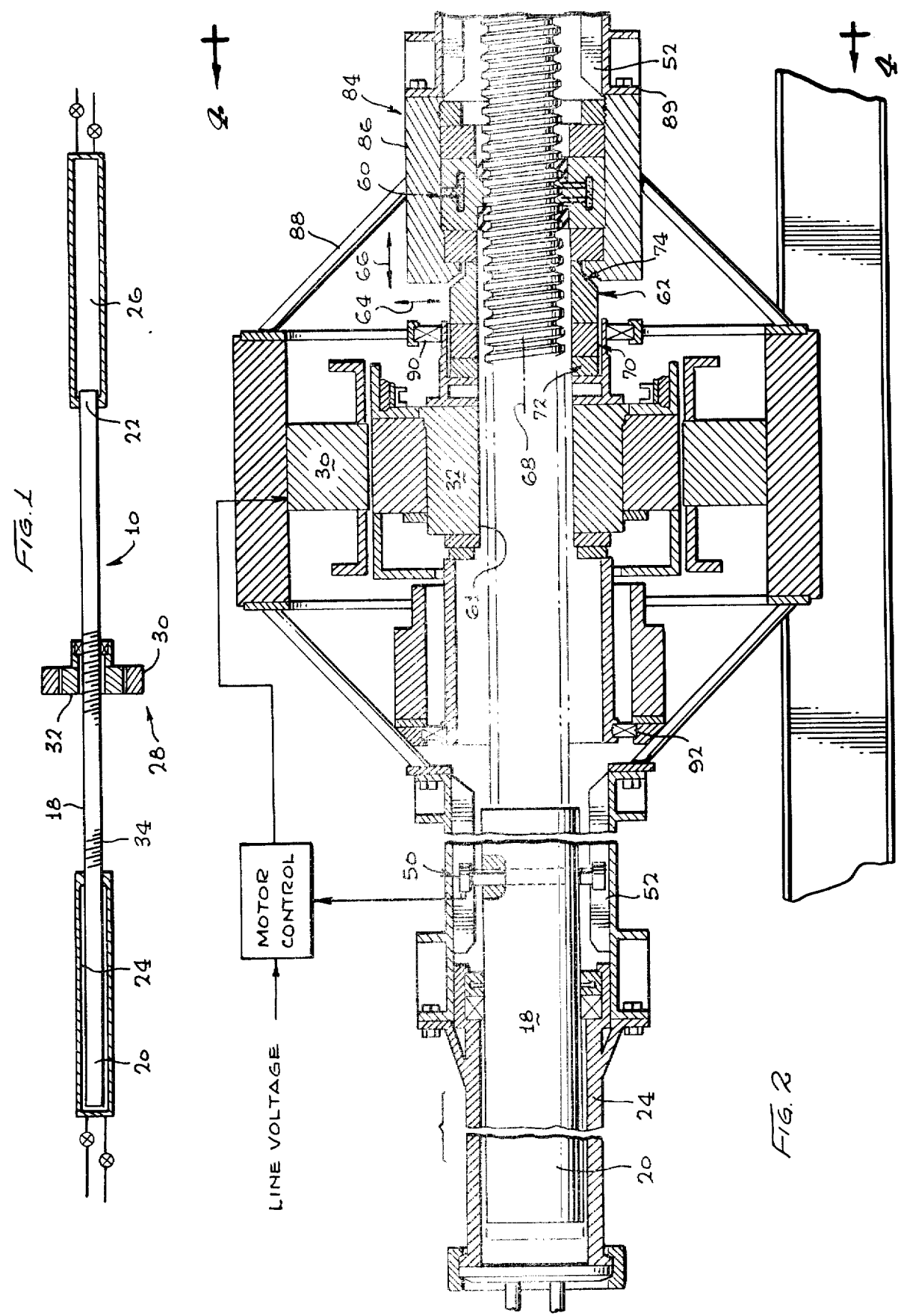

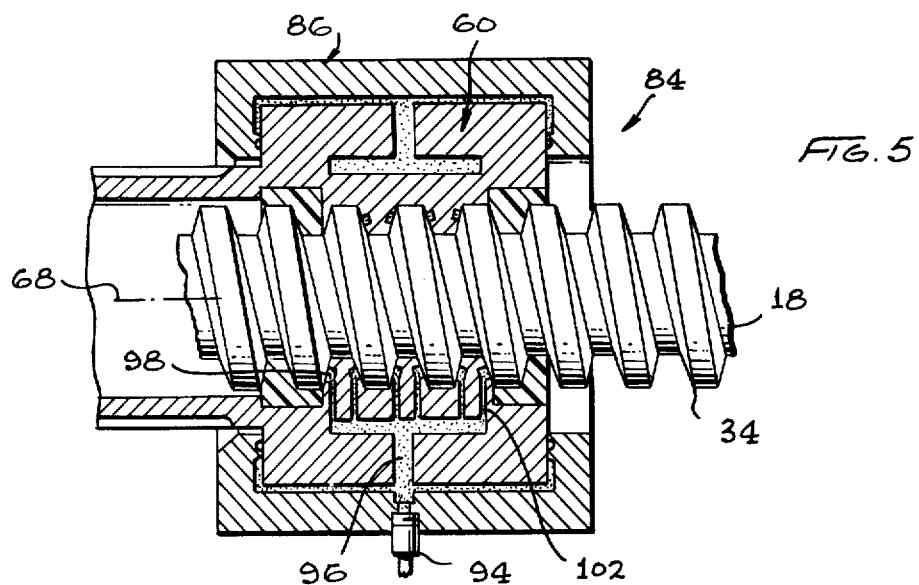
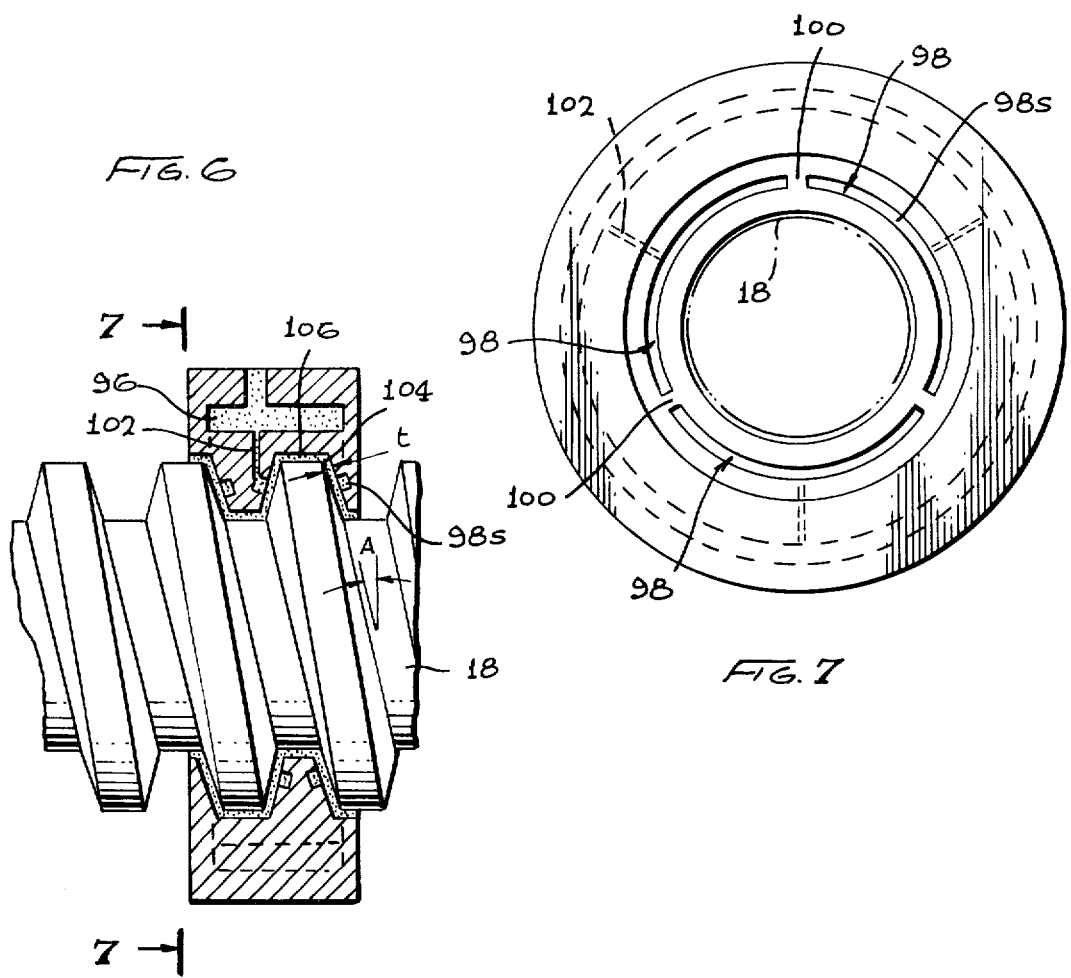

LEAD SCREW LINEAR ACTUATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

One type of linear actuator includes a threaded rod that passes through a threaded hole in the rotor of an electric motor, so that rotation of the rotor advances the rod. U.S. Pat. No. 2,446,393 shows such an actuator. Where the rod must apply very large forces, such a direct motor-to-rod coupling has the disadvantage that large thrust forces are transmitted through the motor rotor, so that conventional low load precision motor bearings cannot be utilized. Such high loads are also difficult to carry through conventional threaded bearings. Direct sliding metal-to-metal contact of the threaded members generates unacceptable friction and wear when lubricants are merely applied to the surfaces. Threaded ball bearing mechanisms cannot withstand very high loads without suffering fatigue damage, and conventional threaded hydrostatic bearings are also found incapable of supporting very high loads without an external centering bearing.

SUMMARY OF THE INVENTION

In accordance with one embodiment of the present invention, a compact and economical linear actuator is provided which can apply very high loads. The actuator includes a rod with a threaded portion, a nut that engages the threaded rod portion, and a motor with a rotor connected coaxially to the nut to turn it. The nut which drives the rod, is coupled to the motor rotor by a coupling that transmits torque to the nut but allows it to shift axially and radially with respect to the rotor. Accordingly, the rotor can be supported by its own ordinary bearings, because the heavy rod load is taken up by separate bearings applied to the nut. The nut has a hydrostatic thread bearing, wherein the typical oil-distributing groove has multiple interruptions to form isolated sectors along the helical oil-distributing groove. As a result, as the threaded rod deflects toward a sector, a greater pressure is applied to the rod thereat to center it, to thereby enable the nut to withstand higher loads.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified sectional view of a linear actuator constructed in accordance with the present invention, shown utilized in a pump.

FIG. 2 is a more detailed sectional view of the actuator of FIG. 1.

FIG. 5 is a partial sectional view of a hydrostatic bearing constructed in accordance with the invention.

FIG. 6 is a sectional view of a portion of the bearing of FIG. 5.

FIG. 7 is a view taken on the line 7—7 of FIG. 6.

DESCRIPTION OF THE PREFERRED EMBODIMENTS

Figure 3:
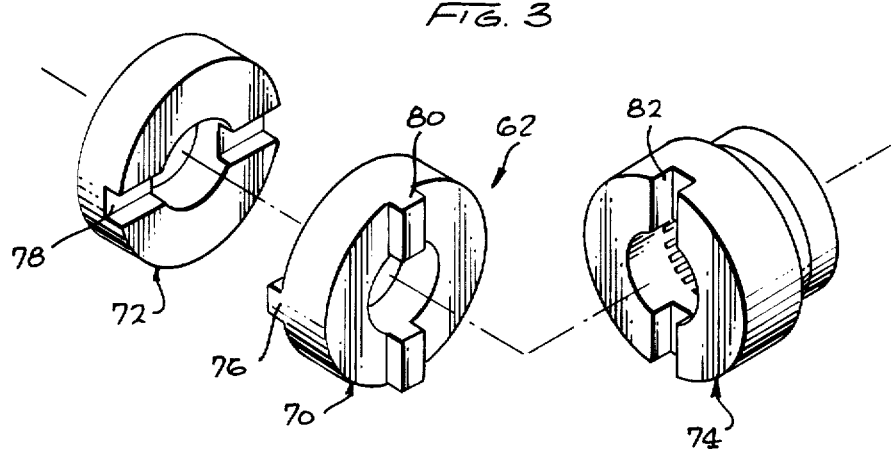
FIG. 3 is an exploded perspective view of a coupling of the actuator of FIG. 2.
Figure 4:
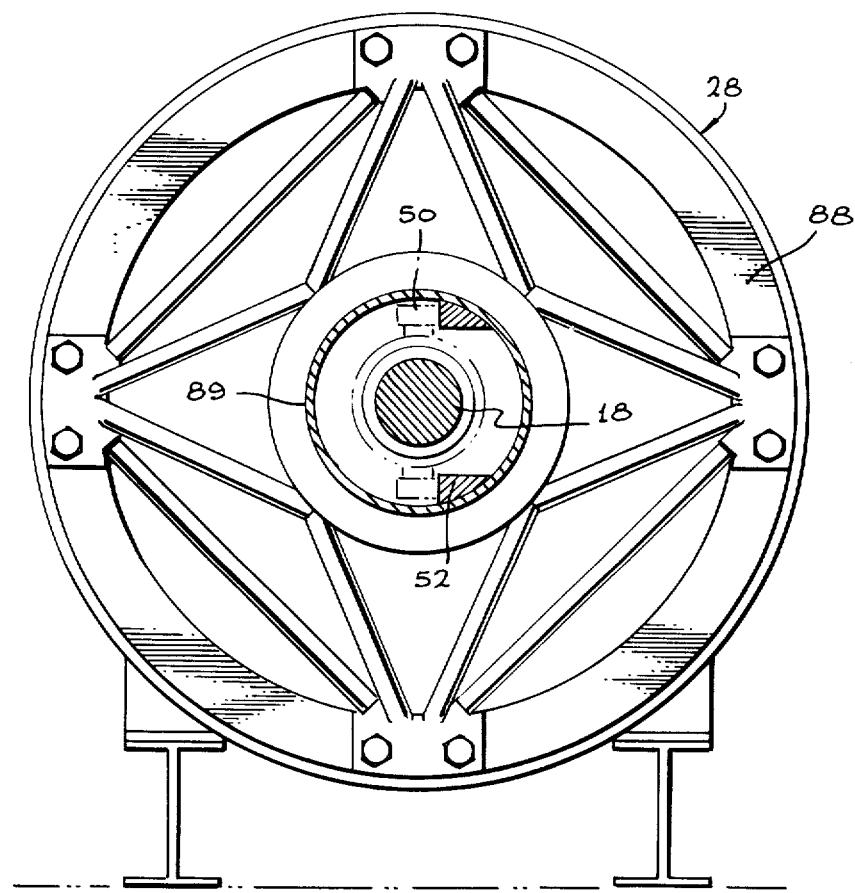
FIG. 4 is a view taken on the line 4—4 of FIG. 2.

FIG. 1 illustrates a linear actuator 10 utilized in a pump to pump fluid at high pressure. The linear actuator includes a rod 18 whose ends 20, 22 are received in pump cylinders 24, 26, so that when the rod reciprocates it pumps fluid alternately out of the cylinders. The rod is reciprocated by an electric motor 28 which includes a stator 30 and a rotor 32, the rotor being threadably coupled to a threaded middle portion 34 of the rod by means of a coupling 62 and a nut 60, as more fully described below.

As shown in FIG. 2, the rod 18 carries an antirotation device 50 having a pair of rollers at its ends, that bear against a pair of tracks 52, to prevent rotation of the rod. A threaded member or nut 60 which is driven by the motor rotor 32 to advance the rod, lies beyond one axial end of the rotor, while the rotor has a central hole 61 large enough to provide clearance around the rod. The nut 60 is of a hydrostatic type, which provides very low friction and can support a large load. In fact, the nut-to-piston friction is low enough compared to the angle of the helical thread, that a force applied to the end of the piston 18 tends to cause the nut 60 to rotate.

The nut 60 which is driven by the motor rotor 32, is directly coupled to the rotor, to turn substantially at the same speed and about the same axis, by an Oldham type coupling 62. This coupling permits the threaded bearing or nut 60 to shift in a radial direction as indicated by arrow 64 and to shift in an axial direction as indicated by arrow 66, with respect to the rotor 32, and yet permits the rotor to apply a large torque about the axis of rotation 68 of the motor rotor 32. FIG. 3 shows details of the coupling which incudes a free floating middle element 70 engaged with an element 72 fixed to the rotor and another element 74 coupled to the nut 60. The middle element 70 has a projection 76 received in a groove 78 of the rotor-connected element 72, and has another projection 80 received in a groove 82 of the nut-driving element 74. It can be seen that the coupling permits both axial and radial shifting of the nut-coupled element 74 with respect to the rotor coupled element 72. Additional axial movement of the nut coupled element 74 is permitted by the use of a spline connection to the nut.

The nut assembly 84 (FIG. 2) which includes the rotating nut 60, includes a nut bearing 86 that is coupled by a mount structure 88 to the motor housing. The mount structure 88 holds the nut bearing 86 in position with respect to the motor, and also holds a shield 89 that connects to one of the pump cylinders 26. The motor rotor 32 is supported by ball bearings 90, 92 which are designed to withstand only relatively small axial and radial forces, and yet maintain the rotor precisely concentric with the motor stator 30. The large axial forces and moderately large radial forces applied by the rod 18, are withstood by a hydrostatic bearing of the nut bearing 86.

The provision of the coupling 62 to connect the motor rotor and nut so as to permit slight relative shifting, facilitates construction and assembly of the system. The rotor bearings can be installed by the motor manufacturer and the motor tested, apart from the rest of the pump or other system in which the actuator is used, and with the degree of bearing precision adapted to the rotor. The motor can be a self contained module useful in a variety of applications. When the motor is in an assembly such as the complete pump, it is not necessary to precisely align the rotor bearing and nut bearing 86. It may be noted that the nut bearings must be aligned with some degree of accuracy with the cylinders 24, 26, but the long shields 89 connecting the cylinders to the nut bearing 86 permit some flexing.

FIG. 5 illustrates details of the nut assembly 84 which includes the rotating nut 60 and the nut housing or bearing 86. The nut housing 86 includes a fitting 94 which receives pressured hydraulic fluid that provides a hydrostatic bearing for supporting the nut 60 against radial and axial thrust. The nut 60 includes a conduit 96 which receives the pressured fluid and delivers it to a groove 98, for application of the hydraulic fluid to the threaded portion 34 of the rod 18. The pressure of the fluid is utilized to center the nut with respect to the rod, both axially and radially.

Prior art threaded hydrostatic bearings have been useful as low friction precision lead screw bearings having the advantages of no static friction, minimum wear to maintain accuracy, no backlash, excellent positional repeatability, high stiffness, and an ability to compensate for small errors in the spacing of the threads. However, such hydrostatic thread bearings have not been found satisfactory for high load conditions, because proper operation of such bearings requires that the nut always be maintained concentric with the axis of the lead screw. If the nut-to-screw clearances change even slightly, as where the nut moves eccentric to the load screw axis, circumferential migration is induced in the oil film. This causes the oil to seek and find the largest clearance region, so that the oil drains from the high pressure area and the film at the more heavily loaded side of the bearing no longer separates the screw and nut bearing under high load conditions.

The present nut 60 is constructed to avoid such migration of oil from areas of high loading, by providing interruptions in the groove 98 that distributes oil about the nut. As shown in FIG. 7, there are preferably three interruptions 100 in the oil-distributing groove 98 along each 360° turn of the spiral. As a result of the division of the oil-holding groove 98 into multiple isolated pockets or sectors 98s by the interruptions, the lead screw-nut assembly is self regulating. That is, any slight movement of the screw 18 closer to one recess or sector 98s will compress the oil trapped therein so it is under a higher pressure, and will relieve the pressure on an opposite sector from which the screw moves away to lower the pressure thereat. This pressure differential tends to restore the screw to a position in alignment with the nut. This construction utilizing an interrupted oil-distribution groove, results in the need for multiple restricted feeds 102, to separately feed oil into each of the isolated sectors 98s. For example, the pressure in the oil distribution conduit 96 may be 5000 psi, and may decrease to 4000 psi in each sector 98s. When a lead screw moves slightly closer to one sector 98s, it reduces the thickness t (FIG. 6) of the oil film 104 adjacent to that sector, so there is a slightly lower outflow of oil to the peripheral region 106 of the nut. At the same time, oil continues to flow from a feed conduit 102 to that sector, so that the slightly increased pressure in that sector is maintained. The fact that the oil films 104 extend at an angle A to the radial direction, results in applying a radial restoring force as well as an axial thrust, so that the oil film helps to keep the nut and screw concentric, and the nut can operate without separate radial bearings to center the screw.

Thus, the invention provides a linear actuator for applying high loads, which can be constructed relatively compactly and economically. The rod has a screw portion driven by a low friction rotating nut that is coupled to a motor rotor by a flexible coupling. The flexible coupling is constructed to permit the nut and rotor to shift axially and radially with respect to one another, so that relatively light bearings can be utilized to support the motor rotor, and separate heavy duty bearings can be utilized for the nut. A hydrostatic nut construction is utilized with an interrupted oil-distribution groove and with separate feeds to the different groove sectors, to enable the nut to withstand very high loading.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. A linear actuator, comprising:
a rod having a threaded portion;
a motor having a stator and a rotor;
a threaded nut means threadably engaging said threaded rod portion; and
a coupling which connects said rotor to said nut means, said coupling constructed to transmit torque about the axis of rotation of the rotor while permitting at least slight shifting of position of the nut means relative to the rotor.

2. The actuator described in claim 1 including:
means closely engaging the ends of the rod for movement of the rod ends along predetermined axes; and
said coupling permits at least slight movement of said nut means relative to said rotor in a direction perpendicular to the axis of said rod.

3. The actuator described in claim 1 including:
first bearing means rotatably supporting said motor rotor radially and in axial thrust; and
second bearing means rotatably supporting said nut means radially and in axial thrust; and wherein
said coupling permits at least slight movement of said nut means relative to said rotor parallel to the axis of said rod.

4. The actuator described in claim 1 wherein:
said nut means is axially spaced from said rotor;
said coupling permits slight shifting of said nut means relative to said rotor in a direction perpendicular to the rod axis; and
said rotor has an axial hole larger than said rod and said rod passes through said hole but is out of contact with the rotor.

5. The actuator described in claim 1 wherein:
said threaded nut means includes walls defining an internal thread with side walls, said side walls having a plurality of recesses spaced along the helix defined by the internal thread for holding hydraulic fluid, and means for applying hydraulic fluid to said recesses including a plurality of restricted feed conduits leading to said recesses to supply fluid thereto.

6. A linear actuator, comprising:

a rod having a threaded portion;

a motor having a stator and a rotor;

a threaded nut threadably engaging said threaded rod portion; and a coupling which connects said rotor to said nut, said coupling constructed to transmit torque about the axis of rotation of the rotor while permitting at least slight relative movement parallel to said axis;

a first bearing means rotatably coupled to said rotor to limit the axial position of the rotor; and a second bearing means rotatably coupled to said nut to limit the axial position of the rotor.

7. A linear actuator, comprising:

a rod having a threaded portion;

a motor having a stator and a rotor;

nut means coupled to said rotor to rotate with it, and threadably engaged with said threaded rod portion, said nut means including walls defining an internal thread, a channel extending in a helix along said walls, and pressured fluid feed means coupled to said channel to provide hydraulic fluid to said channel;

said channel having a plurality of interruptions therealong forming barriers to the free flow of fluid between channel portions that lie on opposite sides of the barrier, and said feed means including a plurality of restricted feed conduits leading to different of said channel portions to supply fluid thereto.

8. The actuator described in claim 7 wherein:

said barriers are positioned so there are at least three barriers in every approximately 360° along said internal thread.

9. In a linear actuator that includes a rod with a screw portion that is advanced by a motor having a rotor, the improvement of a hydrostatic nut apparatus for transmitting power from the rotor to the rod, comprising:

a hydrostatic nut which includes walls defining a helical groove, including side walls and a radially outer wall, for threadably receiving said rod screw portion, said side walls having a plurality of fluid-holding recesses therein spaced along the helical groove; and a nut housing rotatably supporting said hydrostatic nut; and pressured fluid supply means coupled to said recesses to supply pressured fluid thereto; and a coupling extending between said rotor and said nut, said coupling constructed to transmit torque and to permit at least slight shifting in position of said nut relative to said rotor.

10. In an actuator which includes a threaded rod a motor having a stator and a rotor, the improvement of a nut for supporting the threaded rod comprising:

nut walls defining an internal thread with side walls, said side walls having a plurality of recesses spaced along the helix defined by the internal thread, for holding hydraulic fluid, and means for applying hydraulic fluid to said recesses including a plurality of restricted feed conduits leading to said recesses to supply fluid thereto; and a coupling which mounts said nut coaxially to said rotor, said coupling constructed to transmit torque about the axis of rotation of the rotor while permitting at least slight shifting of position of the nut relative to the rotor.

* * * * *